Nov. 16, 1965  J. A. PUTMAN  3,218,104
PERSONNEL RESTRAINT DEVICE
Filed Aug. 20, 1963

INVENTOR.
JAMES A. PUTMAN
BY
ATTORNEYS.

United States Patent Office 3,218,104
Patented Nov. 16, 1965

3,218,104
PERSONNEL RESTRAINT DEVICE
James A. Putman, 10953 Nestle Ave., Northridge, Calif.
Filed Aug. 20, 1963, Ser. No. 303,391
2 Claims. (Cl. 297—389)

This invention relates to personnel restraint devices, and in particular to shoulder harnesses and seat belts.

The present concept of restraining persons in vehicles is to tie them to vehicle structure with inelastic and unyielding means such as webs or cords. If a person wishes to move around, he must either loosen or unfasten the device, thereby sacrificing most or all of the objectives for which the device was installed in the first place. Some restraint devices have provided temporary release means such as spring-loaded reels on which release of a lock enables the person to move about. However, the person is unrestrained until the lock is restored. Therefore, such a device requires conscious care, and may fail to provide protection at the very moment it is needed.

It is an object of this invention to provide a restraint device which permits a person to move around within limits, provided that these movements are accomplished with reasonable, though limited, acceleration limits. The device locks when this acceleration limit is exceeded, in whatever position the person has then assumed. The restrained person therefore can move around and still automatically be held in position when the need for restraint arises.

Inertia-actuated locking restraint devices which are responsive to acceleration levels are not unknown. However, they have been inherently complicated and expensive, because they have had to include reels and associated locking means, which involve mechanical complications and inherent weakness in the various linkages and attachments which must accompany these constructions. The device of this invention involves purely linear pay-out and take-in motion. Retraction is accomplished by a simple linear elastic member, and the locking means rides the member it locks. The resulting construction is free of mechanical and linkage complications. It can therefore be made for less expense than conventional inertia-locking restraint devices.

The personnel restraint device of this invention includes an anchor strap and a harness strap, each of which is looped over a respective pulley, the pulleys being joined to each other. The pulleys form a harness loop and an anchor loop on the harness and anchor straps, respectively. The ends of the harness strap, and one end of the anchor strap, are attached to fixed points, while an inertia lock is adapted to seize the anchor strap and limit the size of the anchor loop. Bias means attempt to increase the size of the anchor loop and keep the harness strap snugly against the restrained person.

The above and other features of this invention will be fully understood from the following detailed description and the accompanying drawings in which.

Figure 1:
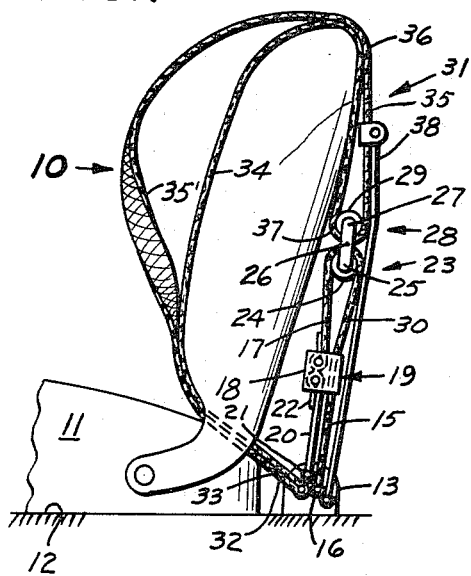
FIG. 1 is a side elevation of the presently preferred embodiment of the invention.

FIG. 1 illustrates a harness 10 in combination with a car seat 11, a car floor 12 and a bracket 13. The bracket is sometimes referred to as a "fixed point." It is rigidly attached to the car floor. The object of the invention is to hold a person relative to the fixed point.

The device includes an anchor strap 15 whose first end 16 is connected to the fixed point and whose second end 17 is connected at 41 (FIG. 6) to case 18 of an inertia lock 19. A first bias means 20 has a first of its ends 21 attached to the fixed point, and its other end 22 attached at 40 to case 18. The second ends 17 and 22 are both stitched back upon themselves in accordance with common sewing practice. Bias means 20 comprises a piece of elastic material which tends to draw the case 18 toward the fixed point 13.

A first pulley 23 includes a roller 24 and an axle 25. A yoke 26 joins axle 25 to axle 27 of a second pulley 28 which includes a roller 29. The anchor strap 15 is looped around the first pulley to form an anchor loop. The effect of the first bias means is to lengthen the anchor loop, which is defined as that portion of the anchor strap on the pulley side of the case 18.

A harness strap 31 has ends 32, 33, attached to the fixed point. One leg 34 of the harness strap from end 33 fits closely to the back of the car seat and extends downwardly behind it and under the second roller. The other leg 35 extends upward from the second roller and forward over the car seat branching at 36 so that there is a leg 35' for each shoulder of the user. Legs 35' rejoin at ends 32 at the fixed points 13 or, if desired, at a separate fixed point for each branch, the mechanical effect being the same.

The harness strap 31 is bent over the second pulley so as to form a harness loop 37 which is defined as that portion of the harness strap dependent from the back of the car seat. The effect of the first bias means is to lengthen the harness loop. A second bias means 38 desirable but not necessary comprises an elastic member connected to the fixed point 13 and to leg 35 above pulley 28. The effect of this bias means also is to lengthen the harness loop. Lenthening this loop snugs the harness strap against the wearer.

Figure 6:
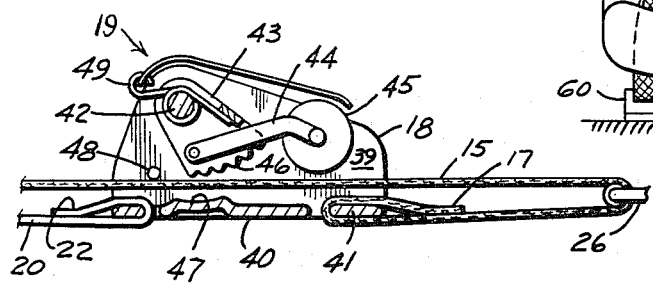
FIG. 6 is a side elevation, partly in cutaway cross-section, of an inertia lock for use with all embodiments.

Inertia lock 19 is shown in full detail in FIG. 6. Its case 18 is double-sided, only side 39 being shown, it being understood that the device is symmetrical around the plane of FIG. 6. A pair of flanges 40, 41 are provided for holding the ends of the first bias means 20 and anchor strap 15 to the case. A hinge pin 42 is attached to both sides of the case and hinges an eccentric clamp 43 to which a yoke 44 floatingly mounts a weight 45. The weight may conveniently be a roller mounted to the yoke. Motion of the weight down or up in the horizontal showing in FIG. 6 moves the serrated edges 46 of the clamp toward and away from the anchor strap. When it is moved against the anchor strap, it presses it into a declivity 47 in flange 40, thereby holding the anchor strap locked and preventing further relative motion in the harness.

A guide pin 48 guides the anchor strap through the clamp. A spring 49 biases the clamp and thereby the weight away from the strap 15, and establishes a selected acceleration limit which must be overcome before the weight can move the clamp sufficiently far to lock the device.

The above inertia lock may be installed in all of the embodiments of this invention.

Figure 3:
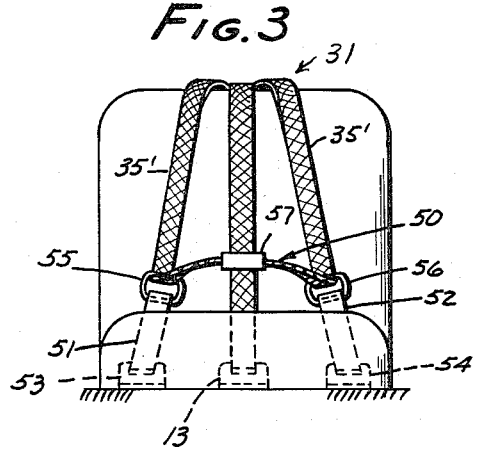
FIGS. 3 and 4 are front and fragmentary side views, respectively, of another embodiment of the invention.
Figure 4:
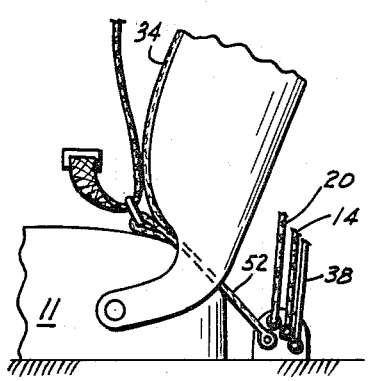

FIGS. 3 and 4 show an alternate embodiment of the invention wherein the harness strap is modified to form a seat belt portion 50 as well. To accomplish this objective, first and second harness segments 51, 52 depart from fixed points 53, 54, respectively, each carrying a ring 55, 56, respectively. The legs 35' are brought through the rings and over the lap of the user to a buckle 57. In this device, the harness strap may be considered to include the forward portions of legs 35' and also the harness segments 51, 52.

Figure 5:
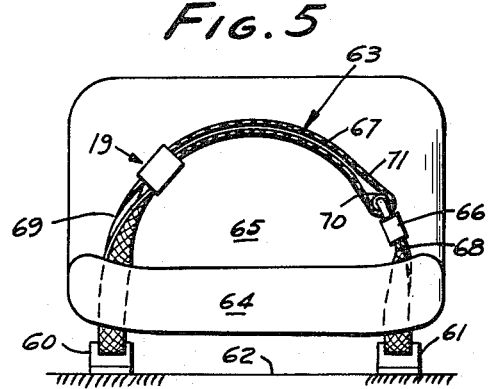
FIG. 5 is a front view of still another embodiment of the invention.

FIG. 5 shows a seat belt incorporating inertia lock 19. In this embodiment, two brackets comprising fixed points 60, 61 are attached to the floor 62 of the car, and anchor web 63 passes between the seat 64 and back 65 of the car seat. A buckle 66 interconnects segments 67, 68 of the anchor web. A first bias means 69 comprises an elastic length attached at one end to fixed point 60 and at the other end to the inertia lock. Segment 67 passes through the inertia lock and loops around roller 70 which is attached to one part of the buckle. This forms anchor loop 71. Segments 67 is attached to the case of the inertia lock as in the anchor loop of FIG. 1. Segment 68 carries the other part of the buckle.

Figure 2:
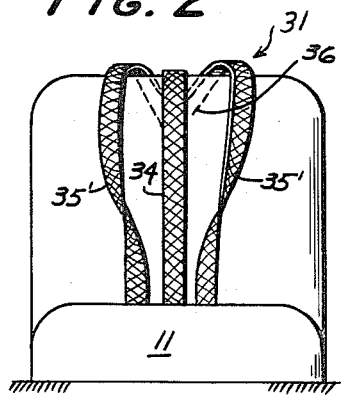
FIG. 2 is a front view of FIG. 1.

The operation of these devices should be evident from the foregoing. In FIGS. 1 and 2, a user simply pulls the harness loops 35' over the front of his shoulders as though he were putting on suspenders. The user can then move around gradually against the restoring force of the bias means. Should the user move too quickly or should he be thrown forward by sudden stoppage of the automobile, then in involuntarily attempting to shorten the harness loop, he will attempt to shorten the anchor loop, thereby pulling the case 18 to the right in FIG. 6 (upward in FIG. 1), tending to move the weight to the left in FIG. 6 (down in FIG. 1) against the force of the spring which, as soon as it is overcome, lets the eccentric member go down onto the anchor web, pressing it firmly against declivity 47 in flange 40 and firmly locking the harness. The harness will remain locked so long as the accelerated forces are in excess of the aforesaid level. In fact, it will tend to remain locked until the harness is backed off slightly.

The operation of the device of FIG. 3 is identical to that of FIG. 1, except that, in addition to putting on the harness loops over the shoulder, a buckled portion is fastened over the lap.

The operation of the device in FIG. 5 is similar to that of FIG. 1, except that it is confined entirely to restraint at the lap of the user. When the user pulls forward at a greater acceleration level than pre-determined by the inertia lock, then the lock grabs on to the strap and prevents the anchor loop from changing size, thereby holding the person against further movement.

In every embodiment of the invention, the user can move around gently against the restraint of the bias means within the accelerative limits established by the inertia lock. These limits can be varied by appropriately varying the spring resistance and the weight. Different types of inertia locks are well known and can be used instead of the illustrated type.

It will be noted that every one of these devices utilizes only linear forces, both for pay-out and take-in motion and also for locking, thereby overcoming the objections of conventional devices.

This invention is not to be limited by the embodiments shown in the drawings and described in the description which are given by way of example and not of limitation, but only in accordance with the scope of the appended claims.

I claim:

1. Personnel restraint means to hold a person relative to a fixed point above a selected acceleration level, comprising: an anchor strap; a first pulley spaced from the fixed point; an inertia lock, the anchor strap being fastened to the lock, passed over the pulley to form an anchor loop, passed through the inertia lock, and fastened to the fixed point, the inertia lock being adapted to seize that portion of the anchor strap passed through it to fix the size of the anchor loop; bias means attached to the fixed point and to the inertia lock tending to increase the size of the anchor loop; a harness strap having at least two ends all attached to the fixed point, the harness strap having a harness loop with one leg branching to engage the shoulders of a person; a second pulley forming the harness loop, the axles of said pulleys being attached to each other, whereby the loops are joined through the pulleys, a pull of less than a selected acceleration level on the said leg shortening said harness loop and pulling on said second pulley to shorten the anchor loop and extend the bias means, a pull of greater acceleration level locking the inertia lock and preventing change in size of either loop.

2. Personnel restraint means according to claim 1 in which the inertia lock includes a case fixed to the anchor loop, and an inertia member floatingly interconnected to the case adapted to lock the anchor loop to the case in response to sufficient relative displacement of the inertia member and case on account of their relative acceleration.

References Cited by the Examiner
UNITED STATES PATENTS

| | | | |
|---|---|---|---|
| 894,052 | 7/1908 | Radtke | 297—386 |
| 2,071,903 | 2/1937 | Shively | 297—386 |
| 2,576,867 | 11/1951 | Wilson | 297—389 |
| 2,705,529 | 4/1955 | Bull | 297—386 |
| 2,708,555 | 5/1955 | Heinemann | 297—386 |
| 2,823,046 | 2/1958 | Banta | 297—389 |
| 2,825,581 | 3/1958 | Knight | 297—386 |

FOREIGN PATENTS

| | | |
|---|---|---|
| 1,186,353 | 2/1959 | France. |

FRANK B. SHERRY, *Primary Examiner.*